INVENTOR
CARL C. JONES
BY Francis H. Vanderwerker
Charles A. Rowe
ATTORNEYS

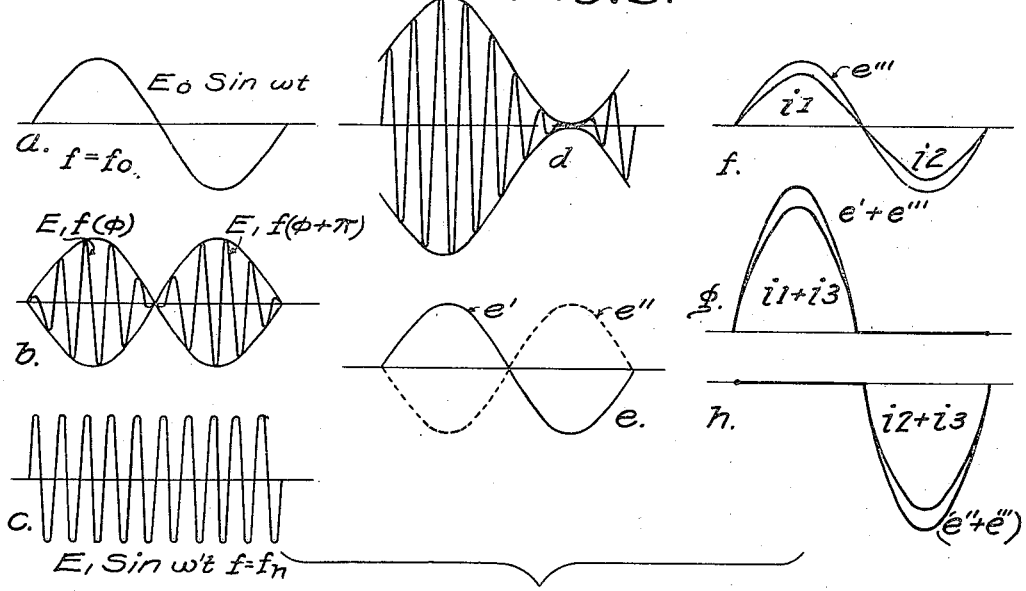
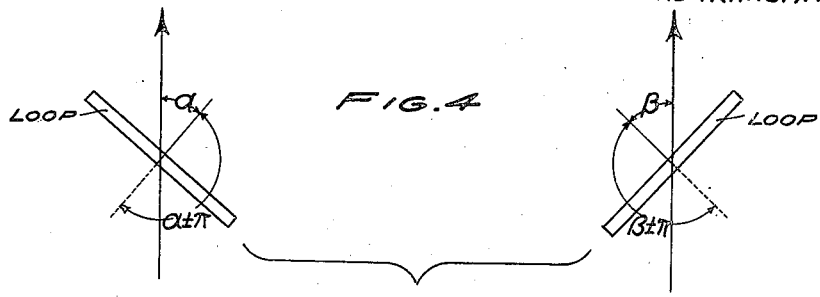
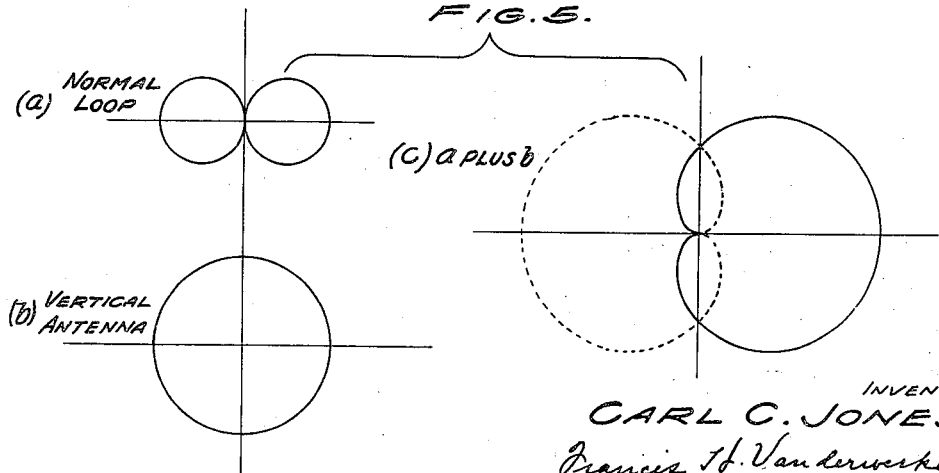

Patented Feb. 14, 1939

2,146,745

UNITED STATES PATENT OFFICE 2,146,745

RADIO DIRECTION FINDING SYSTEM

Carl C. Jones, Clayton, Ohio

Application January 11, 1934, Serial No. 706,236

3 Claims. (Cl. 250—11)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a radio direction finding system, and more specifically to a directional radio receiving system which will provide means for indicating aurally and/or visually a true sense of direction of a source of radio waves, that is to say, the direction from a point of reception to a source of transmission of electro-magnetic wave energy without ambiguity and uncertainty.

An object of the invention is to give accurate bilateral indication and to define one true course without ninety degree or one hundred and eighty degree ambiguity.

Another object is to provide a device capable of being added as a unit to standard radio receiver equipment with a minimum of adjustment and a minimum of mechanical parts.

A further object of the invention is to provide means which will operate both on modulated and unmodulated radio waves, and which will not destroy the characteristics of the received signal. Other objects and advantages will appear as the description proceeds.

The structural organization and mode of operation of a preferred embodiment of the invention will now be described with reference to the accompanying drawings, in which:

Fig. 1 diagrammatically illustrates a system in which the principles of the invention are applied in conjunction with a radio receiving apparatus of a type well known in the art;

Figure 1:
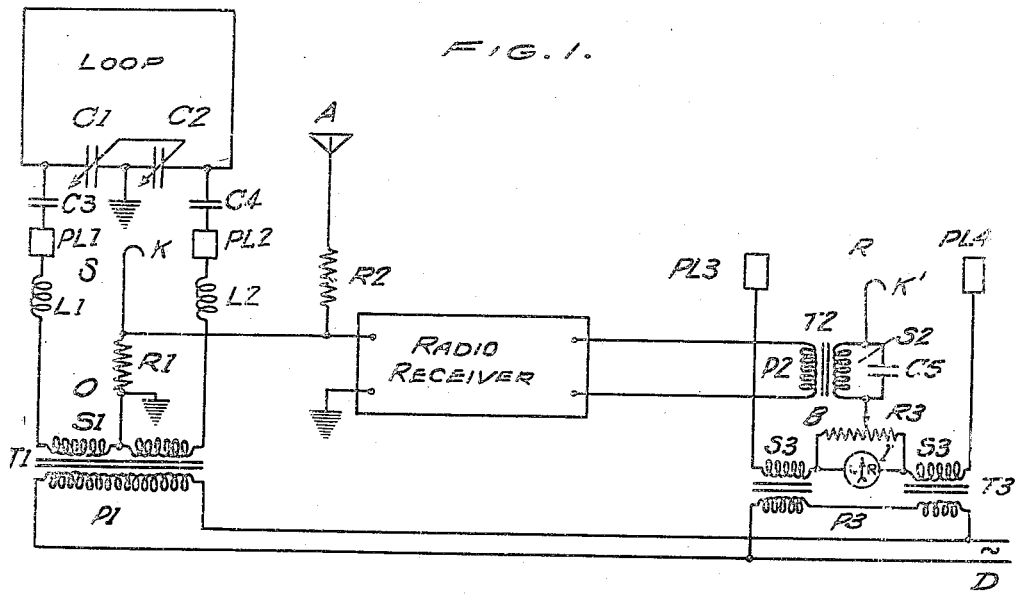
Fig. 1a shows an alternative form of balanced rectifier circuit arrangement.
Figs. 1b and 1c show bridge circuits representing conditions to be satisfied by any balanced rectifier arrangement such as here shown by way of example.
Figs. 1d and 1e show further balanced circuit arrangements in accordance with the principles of the invention.

Figs. 3a to 3h graphically depict changes in the wave forms at different progressive stages of the operation;

Fig. 4 illustrates oppositely disposed angular positions of the loop or directional receiver of wave energy; and Fig. 5 shows polar diagrams graphically representing the energy received by the directional loop and the non-directional antenna, respectively; also a polar diagram representing the field pattern resulting from the combination thereof.

The invention contemplates a directional receiver of wave energy such as a loop operatively connected to a device which alternately switches the phase of such energy; modulates said received energy with a frequency differing from the frequency of the received wave energy, and then combines this modulated energy with the energy from a non-directional antenna, the source of the latter being the same radio waves which energize the loop receiver. The resultant waves of energy thus combined are then subjected to the action of a detector or rectifier, the output of which is introduced into the circuit of a balanced rectifier in a manner described hereinafter more in detail. Radio frequency amplification may be introduced immediately prior to rectification or detection, and audio frequency amplification may be introduced after detection or rectification, if desired.

The balanced rectifier is acted upon by the rectified combination of the loop and non-directional antenna energy in such a manner that the deviation of the loop from a plane normal to the direction of travel of the incoming wave will cause the needle of the zero-center indicator, in the balanced rectifying circuit, to deflect either right or left from its center-zero position and the direction of deflection so indicated is the direct function of the direction of rotation of the loop from the plane normal to the direction of travel of the radio wave. The visual indicator may, at the will or desire of the designer, show a deflection to the right of the zero-center for a right-hand rotation of the loop from the normal plane, and a left deflection for a left rotation of the loop from the normal plane; or the reverse action may be obtained. In either case the reciprocal bearing will give opposite deflection, that is, if one reciprocal gives right and left deflection for right and left rotation respectively, the opposite reciprocal will give left and right deflection for right and left rotation, respectively. Since there are but two zero indications for 360 degrees rotation of the loop, there are no ambiguities for the reasons just set forth.

It will thus be seen that the device embodying this invention enables radio position or direction finding under either fixed or mobile conditions; furthermore, it enables a mobile craft or vehicle to proceed in a direct line toward or away from an emitter of radio energy, unless the procedure in such a direct line is prevented by other agencies or conditions without the scope of this device.

Furthermore, the device comprising this invention is capable of attachment to and use with any standard radio receiving system and does not destroy the intelligibility or volume of the signal on which a bearing or direction is being observed.

Figure 2:
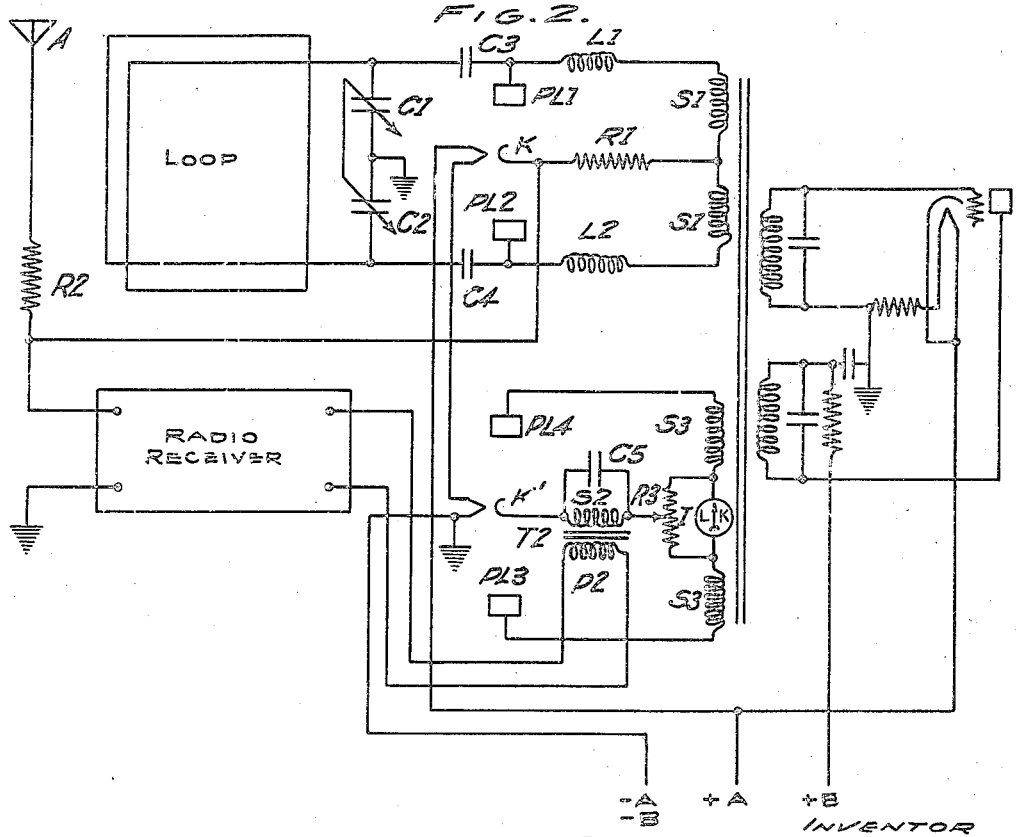
Fig. 2 depicts a practical and convenient embodiment for applying the principles disclosed generally in Fig. 1.

Referring to Fig. 1 or Fig. 2, the loop consisting of a multiplicity of turns of wire is resonated by condensers C1 and C2, the center point between such condensers being grounded, although the ground is not essential to operation. The terminals of the loop are connected to plates PL1 and PL2 of a thermionic vacuum tube or tubes through condensers C3 and C4 which are of a value to present an effective impedance to the alternating voltage applied to the plates of the vacuum tube or tubes. The plates of the vacuum tube or tubes are energized by alternating voltage from secondary S1 of transformer T1 through inductances L1 and L2, which offer an effective impedance to the flow of radio frequency energy from the loop to the secondary winding S1.

The center point of secondary winding S1 is connected through a resistor R1 to the cathode of the vacuum tube or tubes. A ground may be applied at point 0 in this circuit and is here shown although its use is not necessary to proper operation. The terminal of resistance R1 which leads to the cathode or cathodes is connected to the input terminal of a radio receiver. To the same input terminal is connected the non-directional antenna A through resistor R2 whose value of resistance is not critical and which may or may not be required depending upon the effective height of the non-directional antenna. The remaining input terminal of the radio receiver is grounded. The output terminals of the radio receiver are connected to primary P2 of transformer T2 in the balanced rectifier circuit.

The primaries of transformer T3 in the balanced rectifier circuit R and the primary of transformer T1 in the electrical switching circuit generally designated at S are energized from a common alternating current source D which may be an alternator, a vacuum tube generator, or any other form of alternating current generator.

The balanced rectifier circuit R comprises a single full-wave rectifier tube; but a pair of two element tubes may be employed or any tube or tubes with a multiplicity of elements, or any rectifier so connected as to perform essentially the same function. The plates of the vacuum tube or tubes are energized by secondary S3 of transformer T3 in a manner essentially at 180 degrees phase difference.

The common cathode K' is connected through secondary S2 of transformer T2 to slider B on resistor R3 which shunts indicator I, which is inserted at the mid-point of secondary winding S3. Condenser C5 is not essential to operation, but its use when properly selected, increases the efficiency thereof.

Figure 1A:
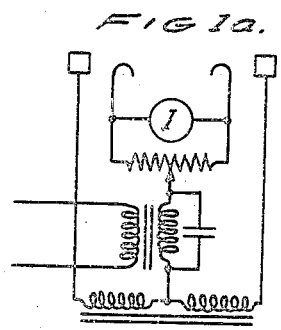
Figure 1B:
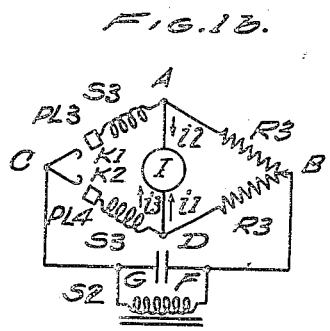
Figure 1C:
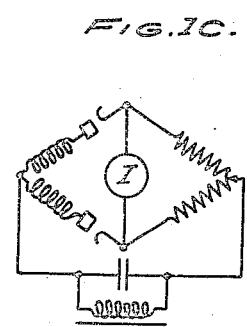

Balanced rectifier circuit R is not limited to the specific circuit arrangement shown in Fig. 1, but may be of the form shown in Fig. 1a, or of any other form of circuit arrangement that will satisfy the conditions of Fig. 1b or 1c.

Referring now to Fig. 4 and assuming the loop to be physically rotated an angle $\alpha$ from the position of minimum reception, so that a radio frequency potential exists at the loop terminals. With the loop in this position, consider the action in circuit S, Fig. 1. When an alternating current, preferably of sine wave form, is introduced in the primary P1 and transferred electromagnetically to secondary S1 of transformer T1, it will be seen that when plate PL1 is positive with respect to the cathode, plate PL2 is negative with respect to the cathode, and vice versa. When plate PL1 is positive, the current will flow between the cathode and plate PL1 and a modulated radio frequency voltage of phase $\phi$ will appear across resistor R1. At this instant plate PL2 is negative and there is no current flow between the cathode and plate PL2. When plate PL2 becomes positive, there is a current flow between the cathode and plate PL2 and a modulated radio frequency voltage of phase $(\phi \pm \pi)$ occurs across resistor R1. Thus, the phases of the radio frequency voltage within its modulated envelope occurring across resistor R1 are shifted electrically essentially 180° in phase when plates PL1 and PL2 alternate in becoming positive in potential. The modulated radio frequency energy occurring across resistor R1 is combined with the radio frequency energy from the non-directional antenna A and introduced in the input circuit of the radio receiver. The phase of the radio frequency energy in the non-directional antenna A is essentially $\phi$ or $(\phi \pm \pi)$. Thus it will be seen that the vertical antenna energy is additive to the radio frequency in one phase and subtractive to the radio frequency which is essentially 180° out of phase. The envelope of the radio frequency energy as presented to the detector or rectifier in the receiver is of the general form shown in Fig. 3.

The output from the rectifier or detector after being amplified, if desired, will appear in primary winding P2 of the transformer T2 in the general form of $e'$ shown in Fig. 3, and will be essentially the fundamental frequency $fo$ which was introduced into primary P1.

In a like manner, it can be shown that if the loop is physically rotated from the point of minimum reception of the loop in the amount of any angle $\beta$ (Fig. 4) which is opposite in sign to the angle $\alpha$ just considered, that the resultant output voltage from the detector or rectifier, which will appear in winding P2, will be of the form $e''$, Fig. 3, and will be plus or minus 180° out of phase with voltage $e'$.

Thus, it will be seen that in winding P2 there will appear voltage $e'$ or $e''$, dependent upon whether the loop is turned one direction or the other from its minimum receptive position. These voltages, $e'$ and $e''$, are transferred to secondary S2 and flow through the indicator I in a manner and with the result that will be described hereinafter.

Referring now to the balanced rectifier circuit R of Fig. 1. The primary winding P3 of transformer T3 is energized from the same alternating current source D as is primary winding P1 of the transformer T1. Thus, plate PL3 will become positive at the instant that plate PL4 becomes negative in potential, and vice versa. The action of circuit R can best be understood by referring to Fig. 1b, which is a schematic arrangement of circuit R in which a single "full-wave" rectifier tube is employed, although the action is similar when copper oxide or other forms of rectifiers are used. When plate PL3 becomes positive, the current flow will be from PL3 to point C, thence through S2 to B. At this point the current will divide in inverse proportion to the resistances of the parallel paths, and one portion of the current will pass through part of R3 from point B to point A, then through secondary winding S3 to PL3. One portion of the current dividing at point B (*i*1) will pass through R3 to point D, then through indicator I to point A, where it will flow through a section of S3 to PL3. It will be noted in this instance that no current flows from point D to point C via plate PL4 since the latter is at a negative potential and effectively opposes the flow of current.

When plate PL4 becomes positive, plate PL3 becomes negative. The current flow is then from plate PL4 to point C, thence through S2 to point B where the current divides in a manner previously explained. One portion of the current flows through a section of R3 to point D, thence through secondary winding S3 to PL4. The remaining portion of the current flows from point B through R3 to A, thence through indicator I to point D (*i*2), thence through S3 to PL4. It will be noted that the current does not divide at point A since the plate PL3 is negative, as has been previously explained.

It will also be noted that currents *i*1 and *i*2, Fig. 3(*f*), flow in opposite directions through indicator I. Therefore, during one complete cycle of *fo* (from source D) there will occur two opposing currents through indicator I and, thus, voltage *e'''*, Fig. 3(*f*), is produced across indicator I. With a properly damped indicator I and a frequency *fo* properly chosen, indicator I will not indicate each opposing pulse but will give a steady deflection proportional to the algebraic difference of currents *i*1 and *i*2. Slider B on resistor R3 is set so that with no energy introduced in S2 from P2 the condition *i*1−*i*2=0 obtains, and the indicator will show a steady reading at the center zero position.

The alternating voltage *e'* or *e''*, Fig. 3(*e*), which has been explained, as existing in primary circuit P2, is transferred electromagnetically to secondary S2, and flows through indicator I, in a manner about to be described, where it is combined with *e'''*, and there results an algebraic sum of these two alternating current voltages.

Assuming now that voltage *e'* (equal to or less than *e'''*) is induced in secondary S2 in phase with *e'''* in S3, and now consider that portion of the cycle when F (Fig. 1b) is positive in potential and G is negative at the time when PL3 is positive and PL4 is negative. The current flow will be from F to point B where the current divides in inverse proportion to the resistance. One portion flows through R3 to A, thence to C via PL3 and back to G. The remaining portion flows through R3 to point D, thence through indicator I to A, (*i*3) through S3 to PL3 thence to C and G. Thus *i*3 is additive to and in phase with *i*1. In this half cycle there is no current flow from D to C via PL4, since PL4 is negative. Also, *i*2 does not flow in this half cycle.

Consider now the second half of the cycle. G and PL4 are now positive and F and PL3 are negative. The current flow (due to *e'*) is from G to C, thence to K2. Thus the potential of K2 tends to become positive and PL4 tends to become negative by reason of *e'* which is in opposition to *e'''* and, therefore, all or part of *i*2 is cancelled, dependent upon the voltage relations. Thus, if *e'* and *e'''* are equal, *i*2 is balanced out and the resultant current through indicator I for complete cycle of *e'* plus *e'''* is of the form shown in Fig. 3(*g*) which will result in a steady deflection of indicator I from its zero position.

In a like manner, it can be shown that a combination of *e''* and *e'''* will result in diminishing *i*1 and increasing *i*2, (Fig. 3(*b*), which will result in a deflection of indicator I opposite to that obtained above for *e'* plus *e'''*. The action can be similarly explained for other voltages relations between *e'*, *e''* and *e'''*.

Figure 1D:
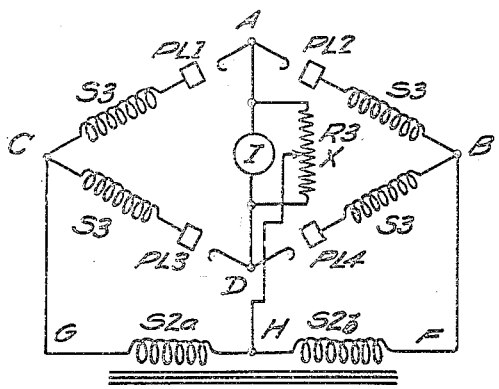
Figure 1E:
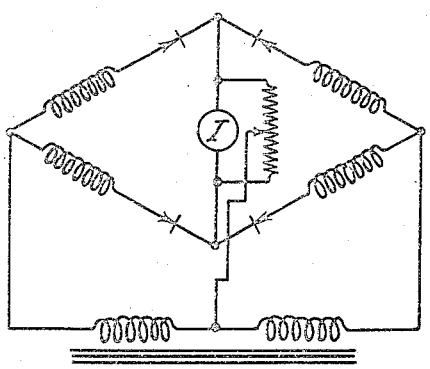

It will be noted that in the circuit shown in Figures 1a, 1b and 1c that the current through the indicator I is in opposing direction for each succeeding half cycle. That is, the indicator meter will receive two opposing pulses per cycle which are of a period differing from the natural period of the meter and are, therefore, not indicated. Figures 1d and 1e illustrate a method by which the alternating current from the secondary S3, when rectified, will pass through the indicating meter in such a manner that, in absence of any signal from the receiver, the current through the meter is balanced at all times. Referring again in Figure 1d, it will be seen that if plate PL1 and plate PL4 are positive at the instant that plates PL2 and PL3 are negative, current through the indicating instrument I is balanced at all times providing point X on resistor R3 is properly chosen. Also, when plates PL2 and PL3 are positive, which occurs at the time when plates PL1 and PL4 are negative, the rectified current through the indicator is likewise balanced. Thus, in absence of a signal from the receiver (*e'* or *e''*), no current flows through the indicating meter and the pointer remains in the center zero position.

A further advantage of this circuit may be realized by assuming a signal (*e'* or *e''*) induced in secondary S2a and S2b. As previously explained, these voltages (*e'* or *e''*) appear in the output of the receiver when the loop antenna is turned either one direction or the other from its minimum receptive position. Applying the analysis employed in the explanation of Figure 1b, it can be shown that in Figure 1d that a directional pulse due to *e'* will appear through indicator I in both halves of the cycle of voltage *e'''*, instead of one directional impulse per cycle of *e'''* as would be the case in the use of the circuit of Figure 1b. Thus, the circuit of Figure 1d when considered over a multiple of complete cycles of *e'''*, will result in a current essentially twice as great as that obtained with circuit 1b, therefore, rendering the device more sensitive to small signal inputs. Figure 1e is essentially the same as Figure 1d except that it shows the arrangement when copper oxide or other forms of rectifiers are employed.

It will thus be seen that the device of this invention can be so constructed or arranged that a turning of the loop to the right of its minimum receptive position will show a right deflection on the indicator I, and that a rotation of the loop to the left of its minimum receptive position will cause a deflection to the left of zero on indicator I.

Thus, it will be seen that the device of this invention may be employed for such purposes as position or direction finding; to track a mobile body; to guide a mobile body toward or away from an emitter of radio energy, or for any other purpose within the scope of the invention.

It is understood that modifications and equivalent arrangements are contemplated as may fairly fall within the scope of the invention and as defined by the appended claims.

I claim:

1. A direction indicating system comprising a directive antenna system for receiving incoming radio frequency radiations, a local source of alternating current, a circuit for modulating currents received in said directive antenna system, means for securing from currents induced in said system resultant currents having a frequency equal to the frequency of said local source, an amplitude dependent upon the deviation of a line perpendicular to the plane of said antenna system from a line joining the center of said system and the source of incoming radiations, and a phase dependent upon the sense of said deviation, a course indicating device, an output switching circuit for alternately supplying said resultant currents to the terminals of said course indicating device, and separate means separately and inductively coupled to said local source for separately energizing said modulating circuit and said output switching circuit.

2. A direction indicating system comprising a directive antenna system for receiving incoming radio frequency radiations, a local source of alternating current, a circuit for modulating currents received in said directive antenna system, means for securing from currents induced in said system resultant currents having a frequency equal to the frequency of said local source, an amplitude dependent upon the deviation of a line perpendicular to the plane of said antenna system from a line joining the center of said system and the source of incoming radiations, and a phase dependent upon the sense of said deviation, a course indicating device, an output switching circuit for alternately supplying said resultant currents to the terminals of said course indicating device, and separate means separately and inductively coupled to said local source for separately energizing said modulating circuit and said output switching circuit, said means including separate transformers, each of said transformers being provided with secondaries having separate windings.

3. A direction indicating system comprising a directive antenna system for receiving incoming radio frequency radiations, a local source of alternating current, a circuit for modulating currents received in said directive antenna system, means for securing from currents induced in said system resultant currents having a frequency equal to the frequency of said local source, an amplitude dependent upon the deviation of a line perpendicular to the plane of said antenna system from a line joining the center of said system and the source of incoming radiations, and a phase dependent upon the sense of said deviation, a course indicating device, an output switching circuit for alternately supplying said resultant currents to the terminals of said course indicating device, and separate means separately and inductively coupled to said local source for separately energizing said modulating circuit and said output switching circuit, said means comprising a transformer having separate primary and separate secondary windings operative with said modulating circuit and a transformer having separate secondary windings operative with said output switching circuit.

CARL C. JONES.